(12) United States Patent
Pfefferl et al.

(10) Patent No.: US 11,016,020 B2
(45) Date of Patent: May 25, 2021

(54) HUMIDITY DETECTION FOR COMPRESSED AIR SYSTEMS

(71) Applicant: Bendix Commercial Vehicle Systems LLC, Elyria, OH (US)

(72) Inventors: David J Pfefferl, Broadview Heights, OH (US); Stephen Howe, Cuyahoga Falls, OH (US); Timothy Carritte, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 136 days.

(21) Appl. No.: 16/376,466

(22) Filed: Apr. 5, 2019

(65) Prior Publication Data
US 2020/0319087 A1 Oct. 8, 2020

(51) Int. Cl.
*G01N 19/10* (2006.01)
*B60T 17/22* (2006.01)

(52) U.S. Cl.
CPC ............ *G01N 19/10* (2013.01); *B60T 17/221* (2013.01)

(58) Field of Classification Search
CPC ..... B01D 53/26; B60T 17/004; B60T 17/221; G01N 19/10; G01N 21/3554; G01N 21/00
See application file for complete search history.

(56) References Cited

U.S. PATENT DOCUMENTS

| | | | |
|---|---|---|---|
| 3,776,038 A | 12/1973 | Elliott | |
| 4,560,429 A * | 12/1985 | Credali | ................. B31F 1/2804 156/208 |
| 5,103,576 A | 4/1992 | Cramer | |
| 5,386,111 A * | 1/1995 | Zimmerman | ......... B60S 1/0822 250/227.25 |
| 6,592,995 B2 | 7/2003 | Topolkaraev | |
| 7,393,135 B2 * | 7/2008 | Kanai | ................ G01N 21/4738 374/19 |
| 7,544,234 B2 | 6/2009 | Fornof | |
| 8,242,919 B2 | 8/2012 | Oguri | |
| 8,336,576 B2 | 12/2012 | Diekmeyer | |
| 10,408,775 B2 * | 9/2019 | Tao | ........................ G01N 21/63 |
| 2008/0110337 A1 | 5/2008 | Hoffman | |
| 2011/0297904 A1 | 12/2011 | Dhinojwala | |
| 2012/0116337 A1 * | 5/2012 | Ales | ....................... G01N 21/35 604/361 |

(Continued)

FOREIGN PATENT DOCUMENTS

WO   WO2016120064 A1   1/2016

OTHER PUBLICATIONS

Reyssat, Hygromorphs: from pine cones to biomimetic bilayers, Jul. 2009, J R Soc Interface (Year: 2009).*

(Continued)

*Primary Examiner* — John Fitzgerald
*Assistant Examiner* — Truong D Phan
(74) *Attorney, Agent, or Firm* — Cheryl Greenly; Brian Kondas; Eugene Clair

(57) ABSTRACT

A device for monitoring humidity in a compressed air system comprises a light emitter; a light sensor; and a hygromorphic element. The hygromorphic element is exposed to a source of compressed air and positioned between the light emitter and the light sensor. The hygromorphic element changes the amount of light passing between the light emitter and the light sensor as the humidity in the compressed air increases.

9 Claims, 7 Drawing Sheets

(56) References Cited

U.S. PATENT DOCUMENTS

| | | | | |
|---|---|---|---|---|
| 2014/0104615 A1* | 4/2014 | Kaneko | ............. | G01N 21/3554 |
| | | | | 356/432 |
| 2014/0166220 A1* | 6/2014 | Borrero | ................ | D21H 11/12 |
| | | | | 162/9 |
| 2017/0146445 A1* | 5/2017 | Mahadevan | ........... | H01H 35/42 |
| 2017/0292534 A1* | 10/2017 | Upadhyay | .............. | F04D 27/00 |

OTHER PUBLICATIONS

E. Reyssat and L. Mahadevan, "Hygromorphs: from pine cones to biomimetic bilayers," Report, Jul. 1, 2009, 7 pages doi:10.1098, Journal of the Royal Society Interface.

A Le Duigou et al., "Natural fibres actuators for smart bio-inspired hygromorph biocomposites," Paper, Oct. 2017, 23 pages, Smart Materials and Structures.

Ingi Agnarsson et al. "Spider silk as a novel high performance biomimetic muscle driven by humidity," Report, Apr. 15, 2009, 5 pages, doi:10.1242, The Journal of Experimental Biology 212.

\* cited by examiner

HUMIDITY DETECTION FOR COMPRESSED AIR SYSTEMS

BACKGROUND

The present invention relates to embodiments of a system, controller and method for detecting humidity downstream of an air dryer in an air brake system. Detecting the level of moisture in an air brake system is important in order to protect downstream components from excess moisture. Moisture may cause decreased service life of the components and increase maintenance costs. Desiccant based air dryers are used in many vehicle applications to adsorb water vapor. However, the longer a desiccant cartridge is used, the more fouled the desiccant material becomes with oil and other contaminants. The more fouled the desiccant material becomes, the less it is able to adsorb water vapor. There is a need to determine the efficacy of the desiccant material and the service life of the cartridge.

One solution has been humidity sensing of the compressed air after it passes through the air dryer cartridge. Typical humidity sensing applications require expensive humidity sensors to be placed directly in the path of the air flow. Some discrete humidity sensors cannot withstand the change in air pressure experienced by the air dryer cartridge as the air dryer cycles through charging and purging cycles. Humidity sensors must also be directly connected to other electronics to receive power and transmit the humidity signal. There is a need for an improved humidity sensing means for use in determining desiccant life in an air dryer cartridge.

SUMMARY

Various embodiments of an apparatus for monitoring humidity in a compressed air system comprises a light emitter, a light sensor and a hygromorphic element. The hygromorphic element is exposed to a source of compressed air and positioned between the light emitter and the light sensor. The hygromorphic element changes the amount of light passing between the light emitter and the light sensor as the humidity in the compressed air increases.

In accordance with another aspect, various methods of determining humidity in a compressed air system are disclosed. One method comprises enabling a light emitter and receiving a quantitative value of light emitted by the light emitter at a light sensor. A hygromorphic element will limit the light value received when the hygromorphic element is exposed to a relatively high humidity due a change in shape of the hygromorphic element. Another method of determining humidity in a compressed air system comprises exposing a hygromorphic element and magnet to an increase in humidity. A controller receives a signal indicating a change in magnetic field due to the change in shape of the hygromorphic element as the humidity increases. The magnetic field increases when the hygromorphic element is exposed to a relatively high humidity.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
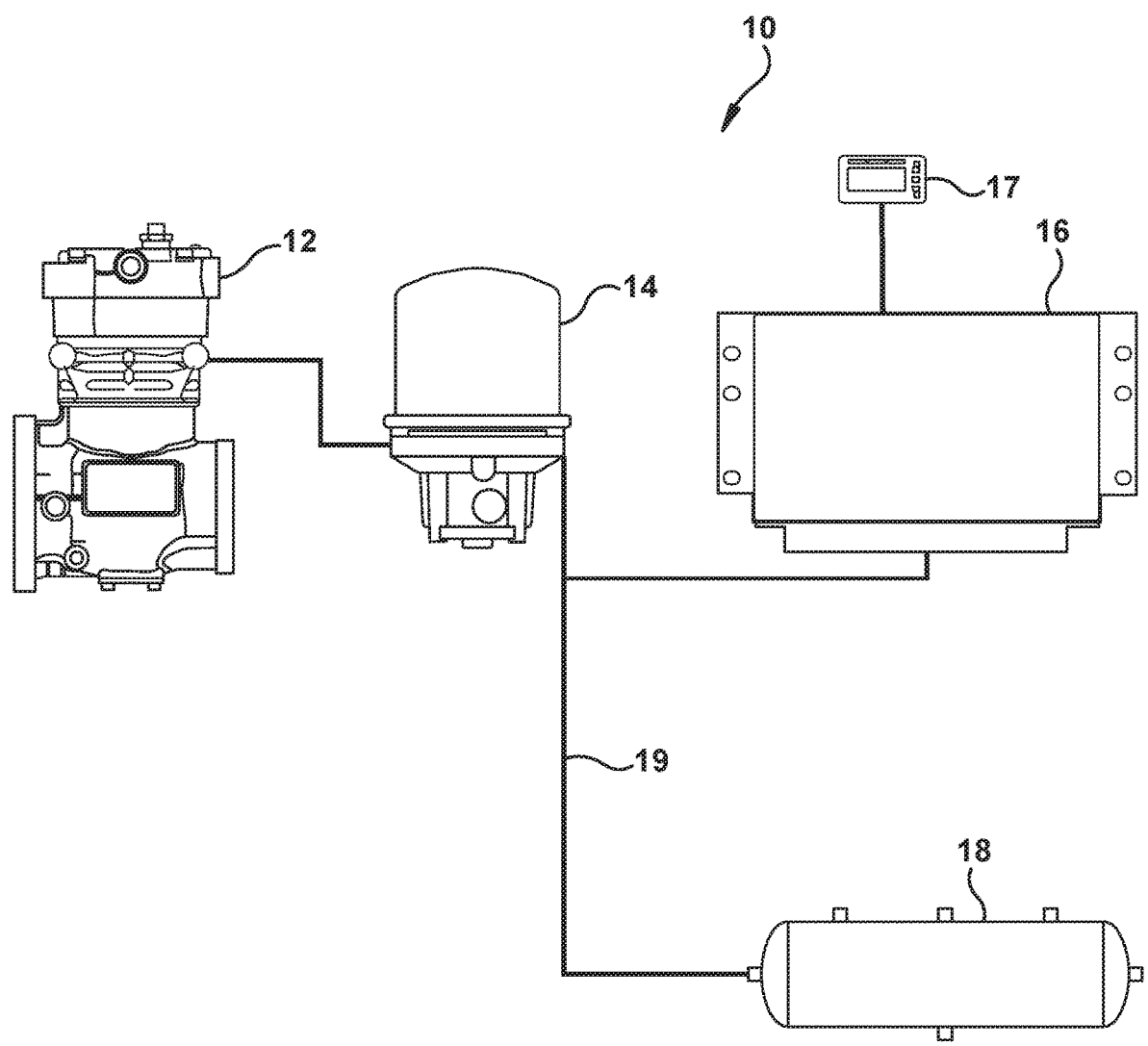
FIG. 1 illustrates an air treatment system schematic according to one example of the present invention.

FIG. 1 illustrates an air treatment system 10. The air treatment system 10 includes a compressor 12 for compressing ambient air for usage in an air brake system. The compressed air from compressor 12 passes to an air dryer 14. The air dryer 14 removes a substantial amount of water and oil vapor from the compressed air. The clean, dry air passes to both a controller 16 and a reservoir 18 via air line 19. The controller 16 may be mounted on the air dryer 14 or may be remote from the air dryer 14. The controller 16 electrically communicates with an indicator device 17.

Figure 2A:
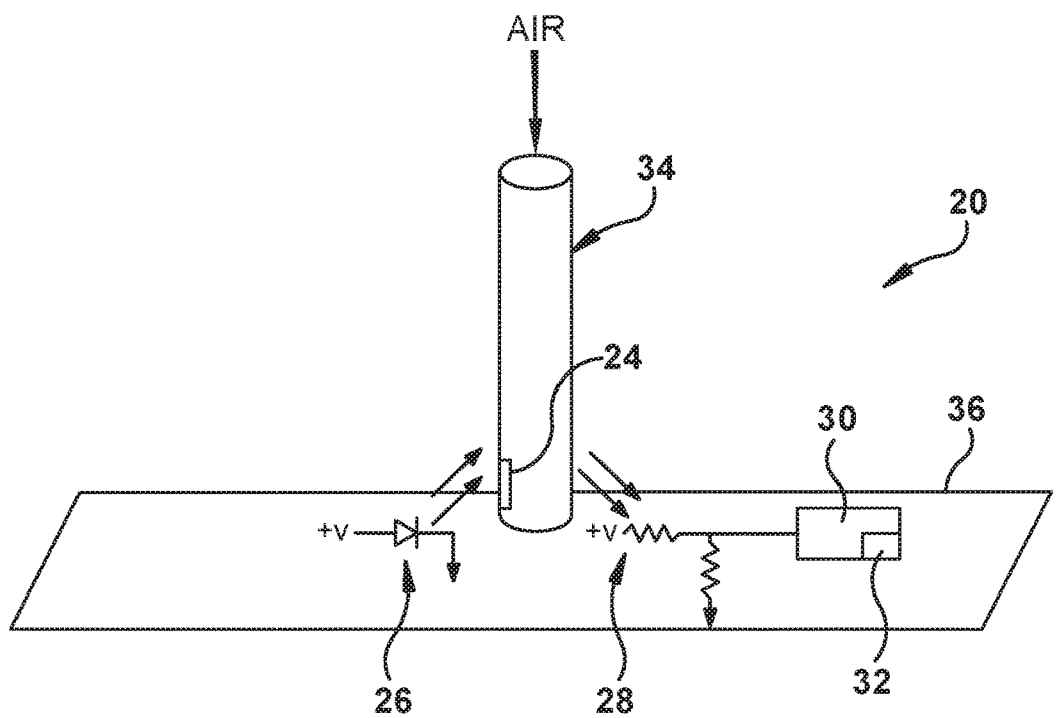
FIG. 2a, 2b illustrate an example of a circuit to be used with a controller of the present invention.

FIG. 2a illustrates a circuit 20 for determining the humidity level in the compressed air received from the air dryer 14 according to one example of the present invention. Tube 34 is pneumatically connected to air line 19 of FIG. 1. The tube 34 is a substantially transparent material, such as an acrylic or polycarbonate plastic. Inside the tube 34 is a hygromorphic element 24. The hygromorphic element 24 may be fixed in the tube 34, fixed to a circuit board 36 or may be configured to be large enough to be held in the tube 34 by engaging the walls of the tube 34. Hygromorphic element 24 changes shape in response to humidity levels in the compressed air, as will be explained.

Tube 34 is connected to circuit board 36, which is contained in controller 16. The circuit board 36 includes a light emitter 26, such as a light emitting diode (LED) or other solid-state device. The circuit board 36 includes a light sensor 28, such as a photo resistor or other solid-state device. The light emitter 26 and light sensor 28 are arranged on the circuit board 36 such that the tube 34 holding the hygromorphic element 24 is between them.

The controller 16 includes a processor 30 having control logic 32 for receiving and transmitting signals. The processor 30 may provide power and/or control signals to the light emitter 26 and light sensor 28. The control logic 32 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 32.

When the light emitter 26 is activated by the control logic 32, the light emitter 26 emits a measurable light amount. The light emitter 26 may be actuated according to a predetermined schedule or may be actuated in response to another action from the control logic 32. The light emitter 26 may be actuated prior to a purge function initiated by the control logic 32 and/or after a purge function initiated by the control logic 32.

In FIG. 2a, the humidity level of the compressed air in tube 34 may be between about 10% to 20%. Because of the low humidity situation, the shape of the hygromorphic element 24 is such that it restricts very little of the light passing through the tube 34. Therefore, the light sensor 28 receives a majority of the light as it passes through the tube 34. In one example, the light sensor 28 receives 80% of the light transmitted by the light emitter 26 when the hygromorphic element 24 is in the low humidity shape, or relaxed. The light sensor 28 transmits the quantitative value of light received to the control logic 32.

The tube 34 and circuit board 36 are arranged to keep any water from settling in the tube 34. Therefore, the circuit board 36 may be oriented perpendicular to the air dryer 14 and/or may be oriented so that the tube 34 is open in a downward direction.

Figure 2B:
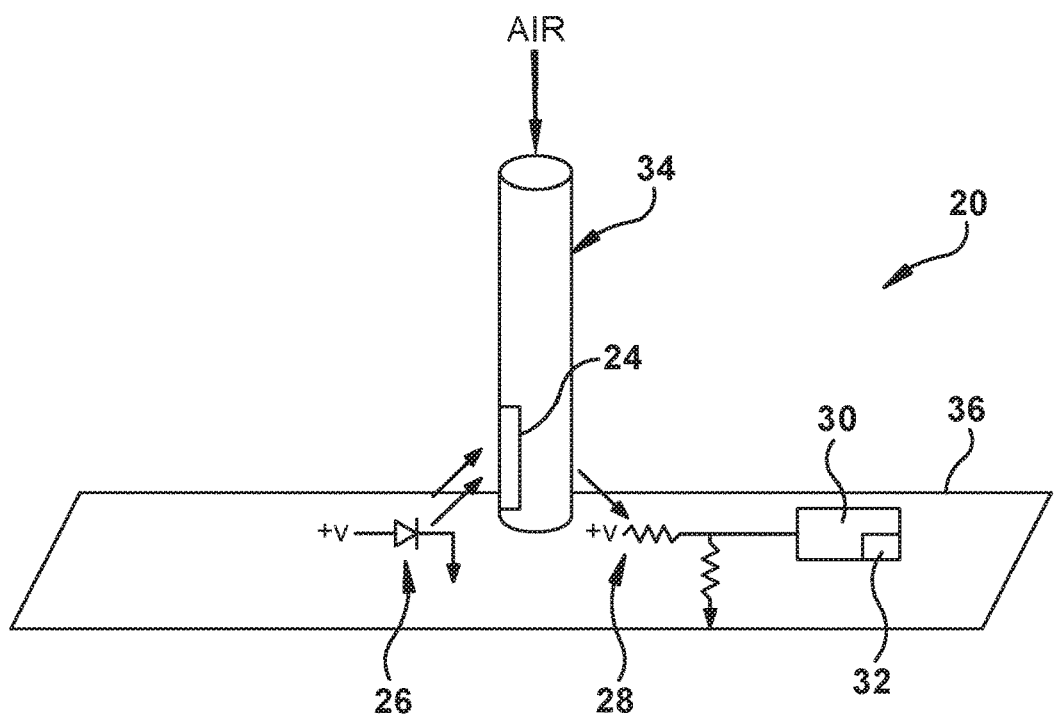

FIG. 2b illustrates circuit 20 showing the change in the hygromorphic element 24 with exposure to increased humidity. In FIG. 2b, the humidity level of the compressed air in the tube 34 may be between 40% and 60%. The hygromorphic element 24 changes shape in response to the increased humidity, as will be explained. The changed shape of the hygromorphic element 24 within the tube 34 will block much of the light transmitted by the light emitter 26 from being received by the light sensor 28 when the hygromorphic element 24 is exposed to a relatively high humidity. In one example, the light sensor 28 receives only 20% of the light transmitted by the light emitter 26 when the humidity is between about 40% and 60%.

The control logic 32 uses the information from the light sensor 28 to determine the humidity level of the compressed air in the tube 34. A high quantitative value of light from light sensor 28 means that it is likely that the humidity level in tube 34 is relatively low. A low quantitative value of light from light sensor 28 means that it is likely that the humidity level in the tube 34 is relatively high.

The control logic 32 can use information from the light sensor 28 over time to determine the efficacy of the desiccant in the air dryer 14. If the humidity level remains high over a period of time, meaning that the light received by the light sensor 28 remains quantitatively low, it is likely that the desiccant cartridge of the air dryer needs to be changed. The driver of the vehicle or the fleet manager may be notified via a warning light in the cab or via a vehicle diagnostic communication system.

In an alternative embodiment, the amount of light passing through the tube 34 between the light emitter 26 and light sensor 28 may be reduced when the hygromorphic element 24 is exposed to a low humidity and increase as the hygromorphic element 24 is exposed to increasing humidity due to the changing shape of the hygromorphic element 24. The control logic 32 is programmed accordingly.

Therefore, a device for monitoring humidity in a compressed air system comprises a light emitter; a light sensor; and a hygromorphic element. The hygromorphic element is exposed to a source of compressed air and positioned between the light emitter and the light sensor. The hygromorphic element changes the amount of light passing between the light emitter and the light sensor as the humidity in the compressed air increases.

Figure 3A:
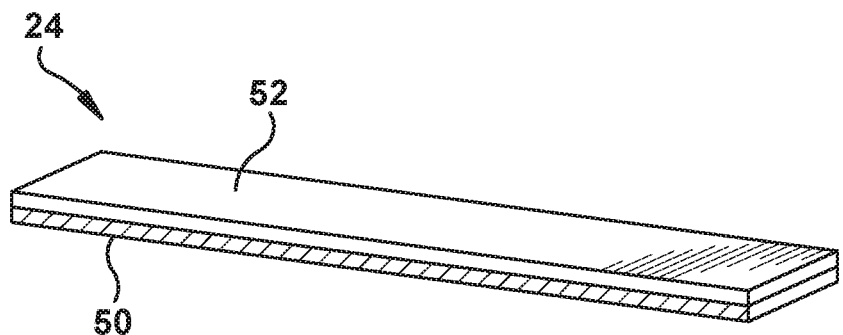
FIGS. 3a, 3b, 4a, 4b, 5a, 5b, 6a, 6b illustrate examples of configurations of the humidity sensitive material for use in the system of FIGS. 2a, 2b.

FIG. 3a illustrates one example of the hygromorphic element 24 in a relaxed state when the humidity is low. When the hygromorphic element 24 is in the relaxed state of FIG. 3a, the humidity is generally between 10% and 20%. The hygromorphic element 24 remains generally planar.

The hygromorphic element 24 comprises hygromorphic material 50 and an auxiliary material 52 layered and affixed together, such as by adhesive or heat pressing. The auxiliary material 52 is passive, meaning it does not change in shape with exposure to humidity levels. The auxiliary material 52 may be plastic or other material. In another embodiment, the auxiliary material 52 may be the same material as the hygromorphic material 50 but layered in a different orientation. The orientation of the longer fibers of the hygromorphic material 50 will govern the behavior of the hygromorphic element 24.

The hygromorphic material 50 may be a hemicellulose rich fiber or pectin rich fiber, such as silk, hemp, flax, or other natural material. Synthetic fibers that absorb water, such as nylon, may also be used. In one example, the thickness of the hygromorphic material 50 is between 50% and 75% of the hygromorphic element 24. The hygromorphic element 24 remains relatively planar when exposed to low humidity because the hygromorphic material 50 is in a relaxed state when exposed to low humidity.

Figure 3B:
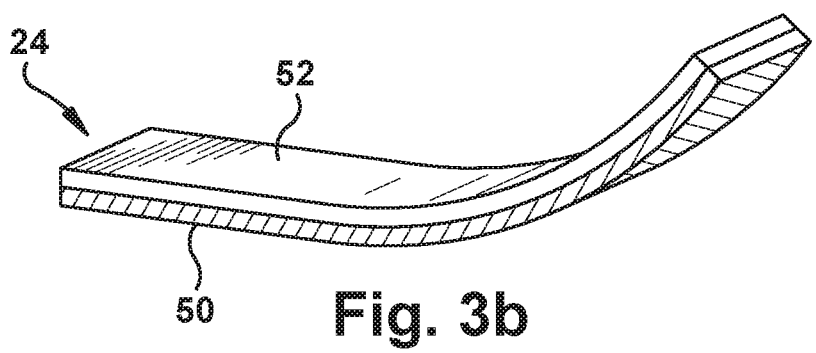

In FIG. 3b, when the hygromorphic element 24 is exposed to relatively high humidity, the hygromorphic material 50 is displaced out of the planar configuration. In this example, the hygromorphic element 24 changes into a partially curved shape. The thickness ratio or stiffness of the auxiliary material 52 contributes to the amount of planar displacement of the hygromorphic element 24. The hygromorphic element 24 will contract a percentage of its length, generally near 20%, upon being exposed to a humidity between 40% and 60%.

The placement of the hygromorphic element 24 into the tube 34 can be such that when the hygromorphic element 24 is beginning to curve as the humidity increases, the hygromorphic element 24 blocks more of the light to light sensor 28. When the humidity decreases, the hygromorphic element 24 returns to its relaxed state and is in the planar configuration as in FIG. 3a. The hygromorphic element 24 has repeatable and reproducible behavior when exposed to increasing and decreasing levels of humidity.

Figure 4A:
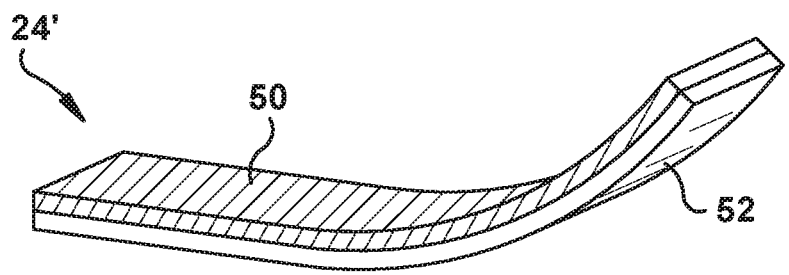
Figure 4B:
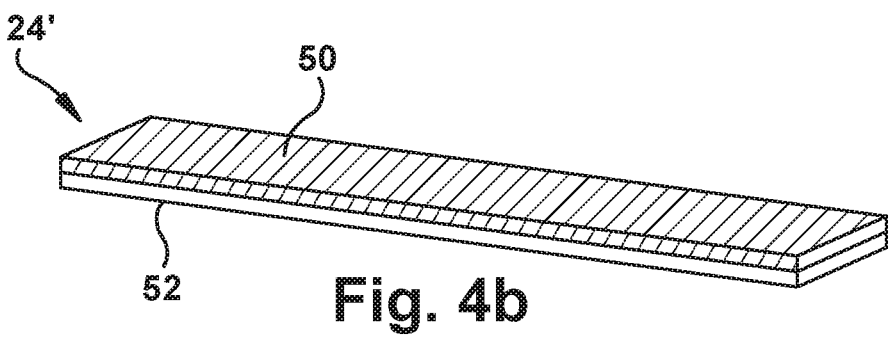

FIG. 4a illustrates another example of a hygromorphic element 24' where the hygromorphic element 24' is contracted and curved when exposed to a relatively low humidity due to the configuration of the hygromorphic material 50 and the auxiliary material 52. FIG. 4b illustrates that the hygromorphic element 24' is in a relaxed state when exposed to a relatively high humidity.

Figure 5A:
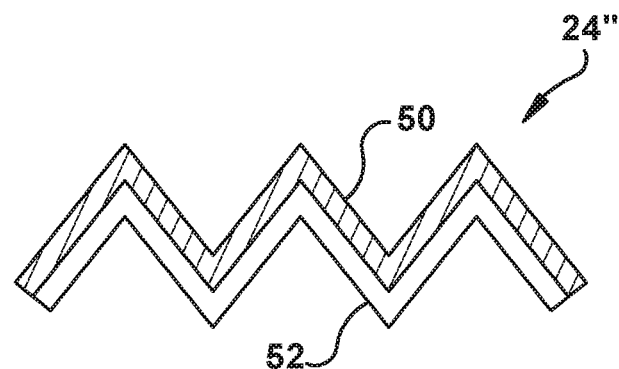
Figure 5B:
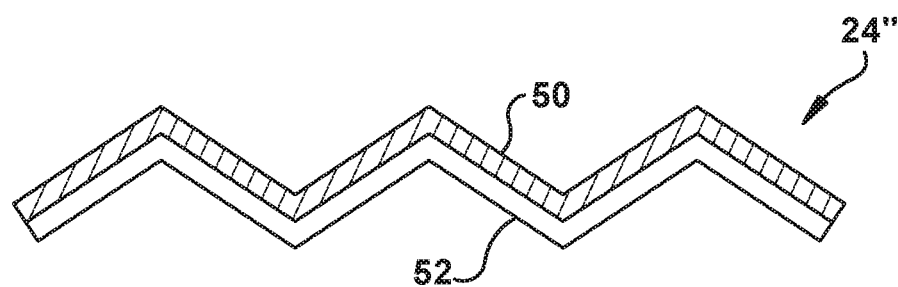

FIG. 5a illustrates another example of a configuration of a hygromorphic element 24". The hygromorphic material 50 is placed with the auxiliary material 52 in a zig zag pattern. When exposed to low humidity, the hygromorphic element 24" remains contracted. In FIG. 5b, the hygromorphic element 24" has relaxed when exposed to high humidity, thus increasing in length. If used in the circuit 20, the hygromorphic element 24" would block more of the light from passing through the tube 34.

Figure 6A:
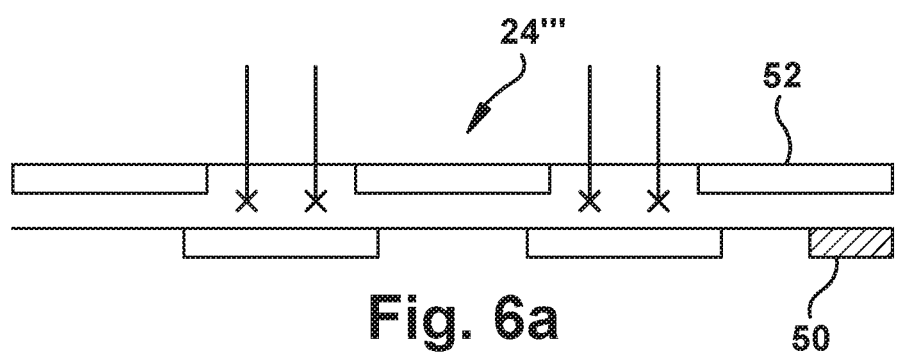
Figure 6B:
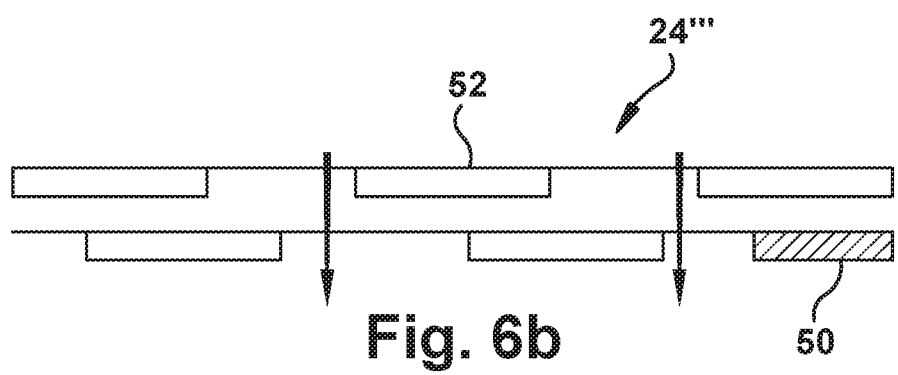

FIG. 6a illustrates another example of a hygromorphic element 24'" where an auxiliary material 52 is aligned with a hygromorphic material 50 in a known pattern to block the light passing through the tube 34 when the hygromorphic element 24'" is exposed to a high humidity level. As shown in FIG. 6b, the hygromorphic material 50 expands to allow light to pass through the hygromorphic element 24'" when the hygromorphic element 24" is exposed to a low humidity.

Therefore, a hygromorphic element used to determine the humidity in a compressed air source comprises a hygromorphic material, such as a pectin rich fiber and a passive material, such as plastic. As the humidity increases, the hygromorphic material tends to contract, causing the shape of the hygromorphic element to change. Alternatively, the hygromorphic material may be laid out in such a manner that the hygromorphic element will relax and remain planar when exposed to low humidity.

Figure 7:
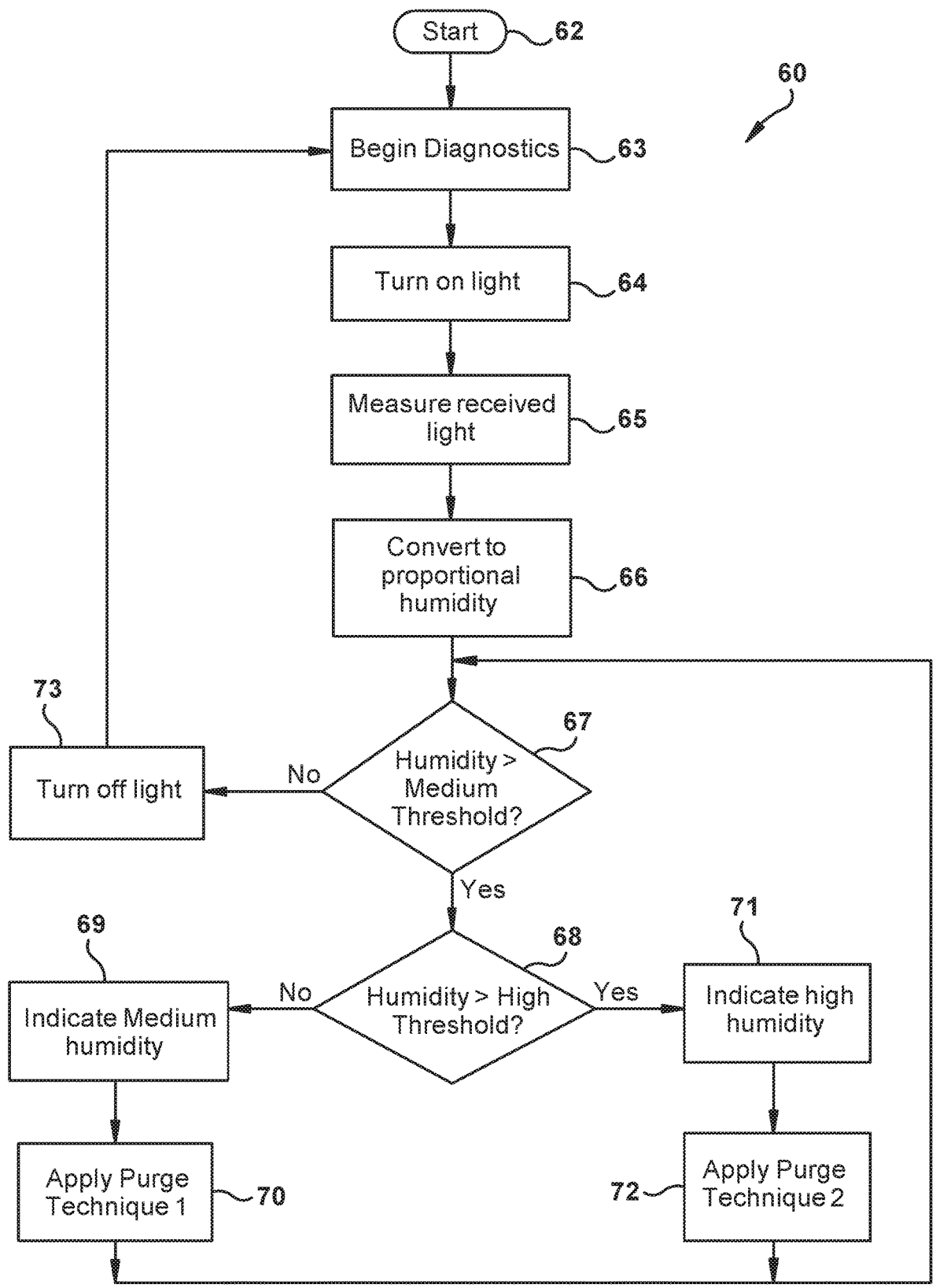
FIG. 7 illustrates a method of operating a humidity sensing system.

FIG. 7 illustrates a method 60 of using the hygromorphic element 24 as configured in FIG. 3a, 3b or FIG. 6a, 6b to determine the humidity and relative efficacy of the air dryer desiccant material in the air treatment system 10. The method 60 begins at step 62. In step 63, the control logic 32 will begin the humidity checking process. The light emitter 26 as shown in FIGS. 2a, 2b will be turned on in step 64.

In step 65, the control logic 32 receives the quantitative light value from light sensor 28. The amount of light received will be converted to a proportional humidity level. This humidity level will be equated with predetermined humidity levels within the memory of the processor 30 in step 66.

In step 67, the humidity level is compared to a predetermined medium level threshold (for example, a 50% humidity level). If the humidity level is not greater than a predetermined medium level threshold, the control logic 32 will turn off the light emitter in step 73. The method 60 will return to step 63 since it has been determined that the humidity level is not significantly elevated.

However, if in step 67, the humidity level is greater than the predetermined medium level threshold, the method 60 continues to step 68.

In step 68, the humidity level is compared to a predetermined high level threshold (for example, a 75% humidity level). If the humidity level is less than the predetermined high level threshold, the method 60 continues to step 69. In step 69, the control logic 32 will indicate the medium humidity value via the indicator device 17 to the driver and/or fleet mechanic. In step 70, the control logic 32 will initiate a first purge technique to reduce the humidity level to less than the medium threshold, such as a low humidity level of about 40%, for example. The first purge technique may consist of one or more purge cycles. The method 60 will return to step 67 after completing the first purge technique to repeat the measurement of the current humidity level against the medium threshold value.

If the humidity level is greater than the predetermined high level threshold, as determined in step 68, the method 60 will proceed to step 71. In step 71, the control logic 32 will indicate a high humidity value via the indicator device 17 to the driver and/or fleet mechanic. The control logic 32 may also communicate the actual humidity level as a percentage (for example 80%).

In step 72, the control logic 32 will initiate a second purge technique, different from the first purge technique, to reduce the humidity level. In response to the indicator of higher humidity in the compressed air, the control logic 32 may increase the number and type of purge cycles to help recycle the desiccant to improve its drying capacity. The method 60 will return to step 67 after completing the second purge technique to repeat the measurement of the current humidity level against the medium threshold value.

Once the humidity level is less than the medium threshold humidity value as in step 67, the method 60 will continue to step 73 and the light emitter 26 will be turned off. The method 60 will return to step 63 to wait for another diagnostic request.

In another example method, the control logic 32 receives the quantitative light value from light sensor 28. In this example, the light value received will be compared directly to a predetermined light value stored the memory of the processor 30. If the light received is greater than a predetermined value, the control logic 32 will indicate a high humidity value. If the light received is less than the predetermined value, the method returns to the beginning of the diagnostic process.

In yet another example, the hygromorphic element 24 may be monitored continuously for changes in humidity, before and after each purge cycle or upon request of the control logic 32. The hygromorphic element 24 changes state in response to a change in humidity within seconds to provide accurate and timely readings.

Therefore, a method of determining humidity in a compressed air system comprises enabling a light emitter and receiving a quantitative value of light emitted by the light emitter at a light sensor. A hygromorphic element limits the light value received when the hygromorphic element is exposed to a relatively high humidity due a change in shape of the hygromorphic element.

Figure 8A:
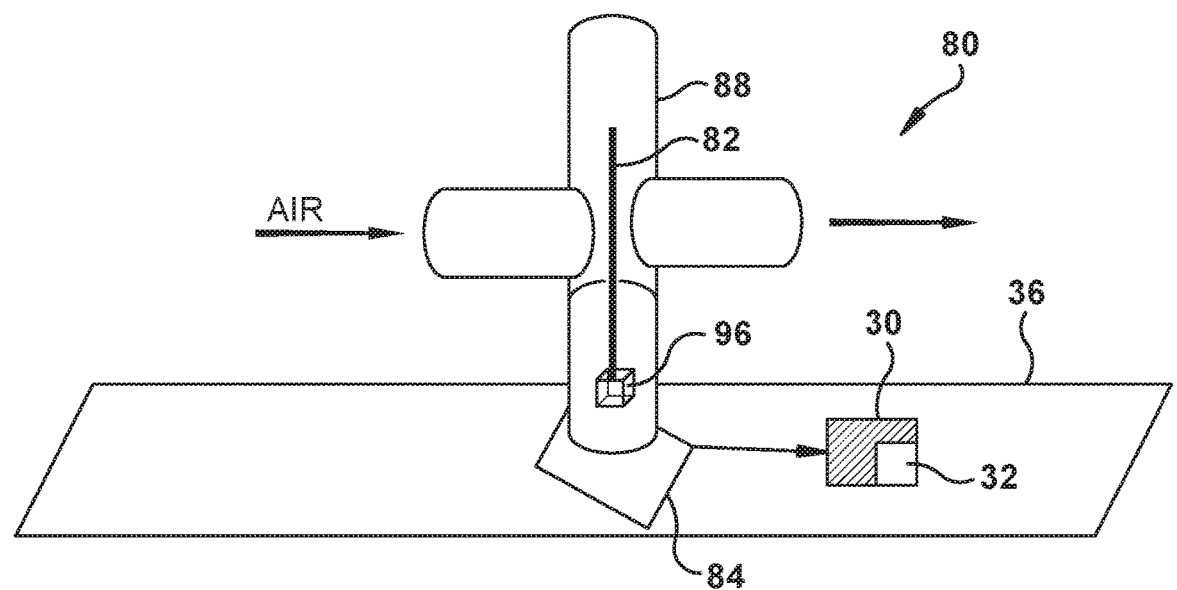
FIGS. 8a, 8b illustrate another example of a configuration of the humidity sensitive material and circuit using a magnetic sensor.

FIG. 8a illustrates an example of a circuit 80 configured to interpret the humidity of the air in a tube 88. The tube 88 is configured to hold a hygromorphic element 82. In this configuration, the tube 88 is in a relative cross shape such that the compressed air received from the air dryer 14 is flowing across the hygromorphic element 82.

As shown in FIG. 8a, the hygromorphic element 82 is relatively planar when exposed to a low humidity. No auxiliary material may be required for this embodiment. The orientation of the fibers of the hygromorphic element 82 should be between 60 degrees and 90 degrees with respect to the long axis of the device. A magnet 96 may be attached to one end of hygromorphic element 82. The magnet 96 will interact with a magnetic sensor 84 on the circuit board 36 outside of the tube 88. The magnetic sensor 84 communicates with the processor 30.

Figure 8B:
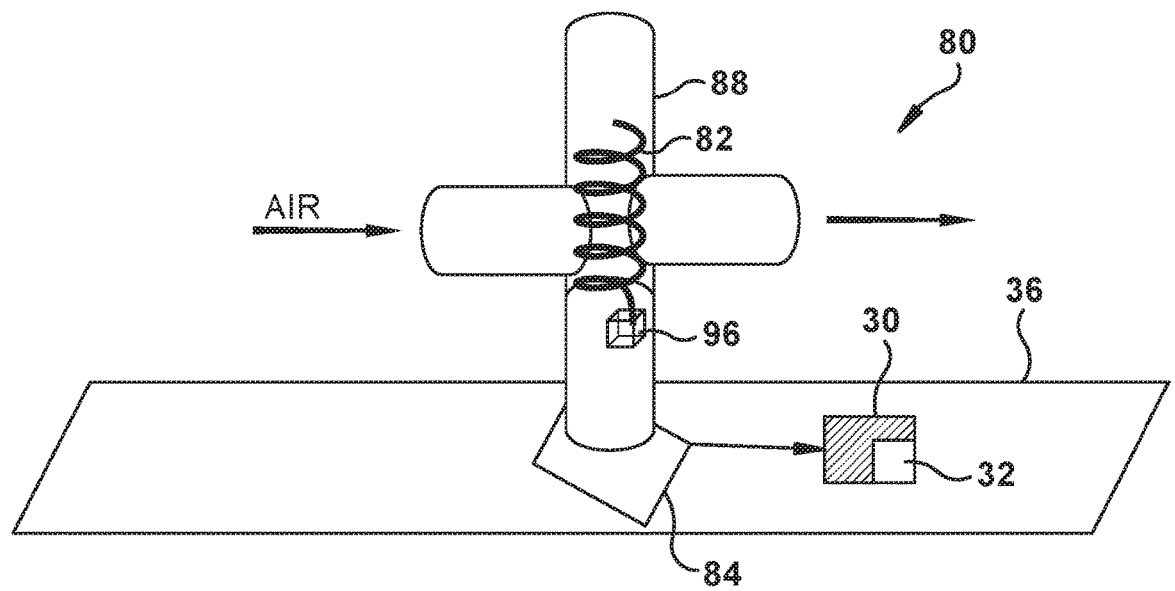

As shown in FIG. 8b, the hygromorphic element 82 will twist in response to increased humidity. Instead of determining light passing through the tube 88 as in FIGS. 2a, 2b, the magnetic sensor 84 receives the information regarding the rotation of the magnet 96 and transmits the orientation of the magnet to control logic 32 inside processor 30. The greater the angular displacement the magnetic sensor 84 detects, the higher the humidity level.

Therefore, a device for monitoring the humidity in a compressed air system comprises a magnet; a magnetic field sensor; and a hygromorphic element affixed to the magnet and exposed to a source of compressed air. The hygromorphic element is positioned within range of the magnetic field sensor. The hygromorphic element changes position as the humidity in the compressed air increases, thereby changing the magnetic field as the position of the magnet changes.

Figure 9:
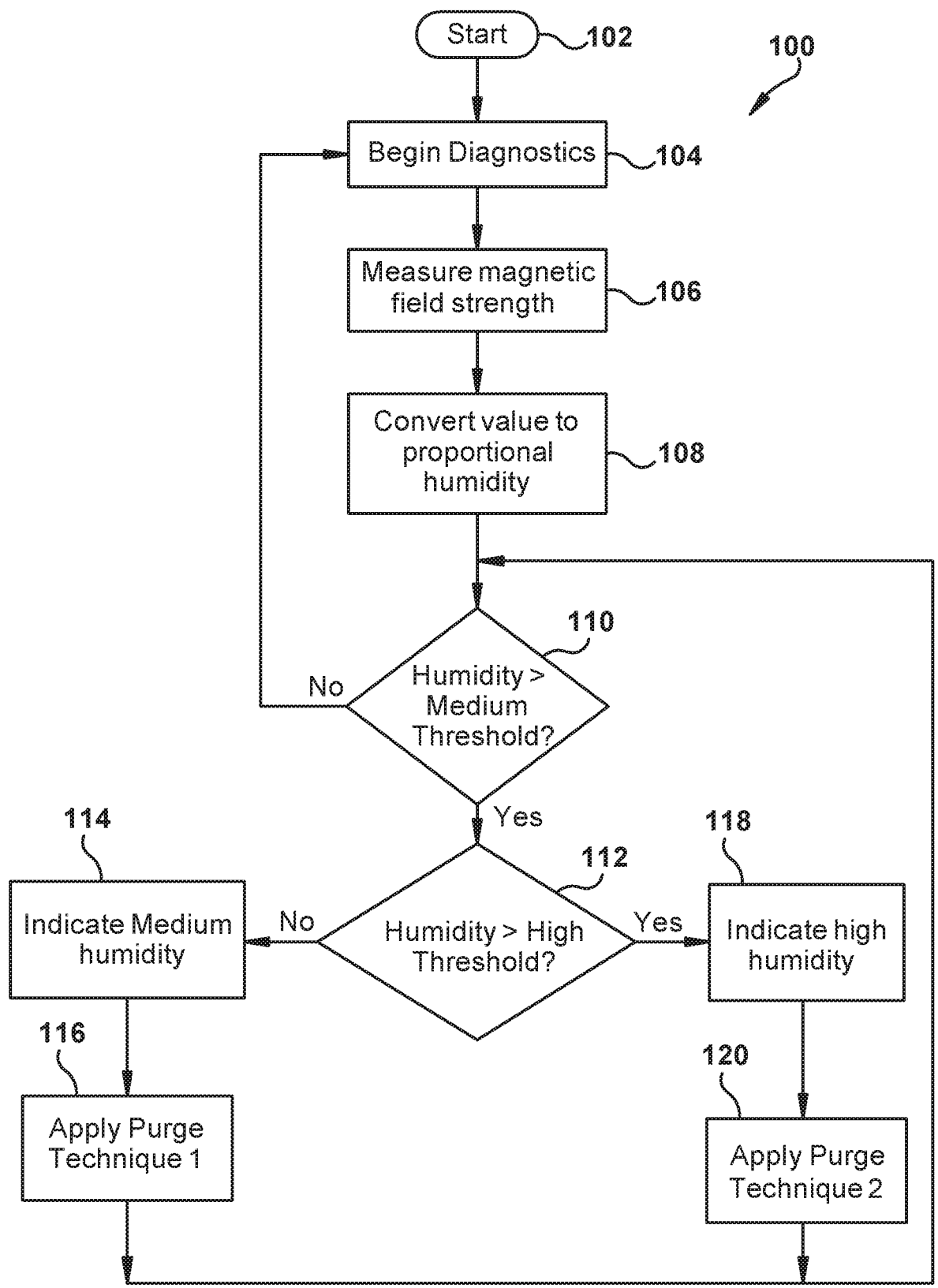
FIG. 9 illustrates a method of operating a humidity sensing system with the configuration as in FIGS. 8a, 8b.

FIG. 9 illustrates a method 100 of using the hygromorphic element 82 as configured in FIG. 8 to determine the humidity and relative efficacy of the air dryer desiccant material in the air treatment system 10. The method 100 begins at step 102. In step 104, the control logic 32 will begin the diagnostic checking process. The control logic 32 receives the signal from the magnetic sensor 84.

In step 106, the control logic 32 measures the magnetic field strength received from the magnetic sensor 84 due to the proximity of the magnet 96. The magnetic field strength received will be converted to a proportional humidity level in step 108. This humidity level will be equated with predetermined humidity levels within the memory of the processor 30.

In step 110, the humidity level is compared to a predetermined medium humidity threshold, for example a 50% humidity level. If the humidity level is not greater than this predetermined medium level threshold, the method 100 returns to step 104 to begin another diagnostic process.

If in step 110, the control logic 32 determines that the humidity level is greater than the predetermined medium level threshold, the method 100 continues to step 112. The humidity level is compared to a predetermined high humidity threshold, for example 60%, in step 112.

If the humidity level is less than the high humidity threshold, the method 100 continues to step 114. The control logic 32 will transmit a signal to the indicator device 17 to indicate the medium humidity value. In step 116, the control logic 32 will initiate a first purge technique to reduce the humidity level to less than the medium threshold. The first purge technique may consist of one or more purge cycles. The method 100 will return to step 110 to compare the humidity level with the medium humidity level threshold again.

If the humidity level is greater than the predetermined high level threshold in step 110, the method 100 will proceed to step 118. In step 118, the control logic 32 will indicate a high humidity value via the indicator device 17 to the driver and/or fleet mechanic. The control logic 32 may also communicate the actual humidity level as a percentage (for example 80%).

In step 120, the control logic 32 will initiate a second purge technique, different from the first purge technique, to reduce the humidity level to less than the medium threshold level. In response to the indicator of higher humidity in the compressed air, the control logic 32 may increase the number and type of purge cycles to help recycle the desiccant to improve its drying capacity. The method 100 will return to step 110 after completing the second purge technique to repeat the measurement of the current humidity level against the medium threshold value.

Once the humidity level is less than the medium threshold humidity value as in step 110, the method 100 will continue to step 104 to wait for another diagnostic request.

Alternatively, the hygromorphic element 82 may be monitored continuously for changes in humidity, before and after each purge cycle or upon request of the control logic 32. The hygromorphic element 82 changes state in response to a change in humidity within seconds.

Therefore, a method of determining humidity in a compressed air system comprises exposing a hygromorphic element and magnet to an increase in humidity; receiving a signal indicating a change in magnetic field due to the change in shape of the hygromorphic element as the humidity increases; and increasing the magnetic field when the hygromorphic element is exposed to a relatively high humidity.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A device for monitoring humidity in a compressed air system comprising:
    a light emitter;
    a light sensor; and
    a hygromorphic element exposed to a source of compressed air and comprising a passive material coupled to a hygromorphic material to accentuate a reaction of the hygromorphic material to an increase in humidity, the hygromorphic element positioned between the light emitter and the light sensor; wherein the hygromorphic element restricts an amount of light passing between the light emitter and the light sensor by changing shape as the humidity in the compressed air increases.

2. The device as in claim 1, wherein the hygromorphic element is inside a tube and the light emitter and light sensor are outside the tube.

3. The device as in claim 1, wherein the hygromorphic material is one of a hemicellulose rich fiber or a pectin rich fiber.

4. The device as in claim 1, wherein the passive material is a plastic material.

5. A system to monitor humidity comprising:
    a pneumatic input for receiving a source of compressed air;
    a hygromorphic element exposed to the source of compressed air, the hygromorphic element comprising a passive material coupled to a hygromorphic material to accentuate a reaction of the hygromorphic material to an increase in humidity; and
    a circuit comprising:
        a light emitter;
        a light sensor; and
        control logic, wherein the control logic activates the light emitter and monitors the received light levels at the light sensor, wherein the hygromorphic element changes shape in response to the increase in humidity in the air source, thereby changing an amount of light received by the light sensor from the light emitter.

6. The system as in claim 5, further comprising a tube for receiving the compressed air, wherein the hygromorphic element is inside the tube and the light emitter and light sensor are outside the tube.

7. The system as in claim 5, wherein a restriction in the amount of light received by the light sensor is indicative of an increase in humidity in the compressed air.

8. A method of determining humidity in a compressed air system comprising:
    enabling a light emitter;
    receiving a quantitative value of light emitted by the light emitter at a light sensor; and
    limiting the light value received through a change in shape of a hygromorphic element comprising a passive material coupled to a hygromorphic material to accentuate a reaction of the hygromorphic material when the hygromorphic element is exposed to a relatively high humidity.

9. The method of claim 8 further comprising: Increasing the light value received when the hygromorphic element is exposed to a relatively low humidity.

* * * * *